C. F. Ritchel,
Stone Drill.
Nº 80,769.   Patented Aug. 4, 1868.
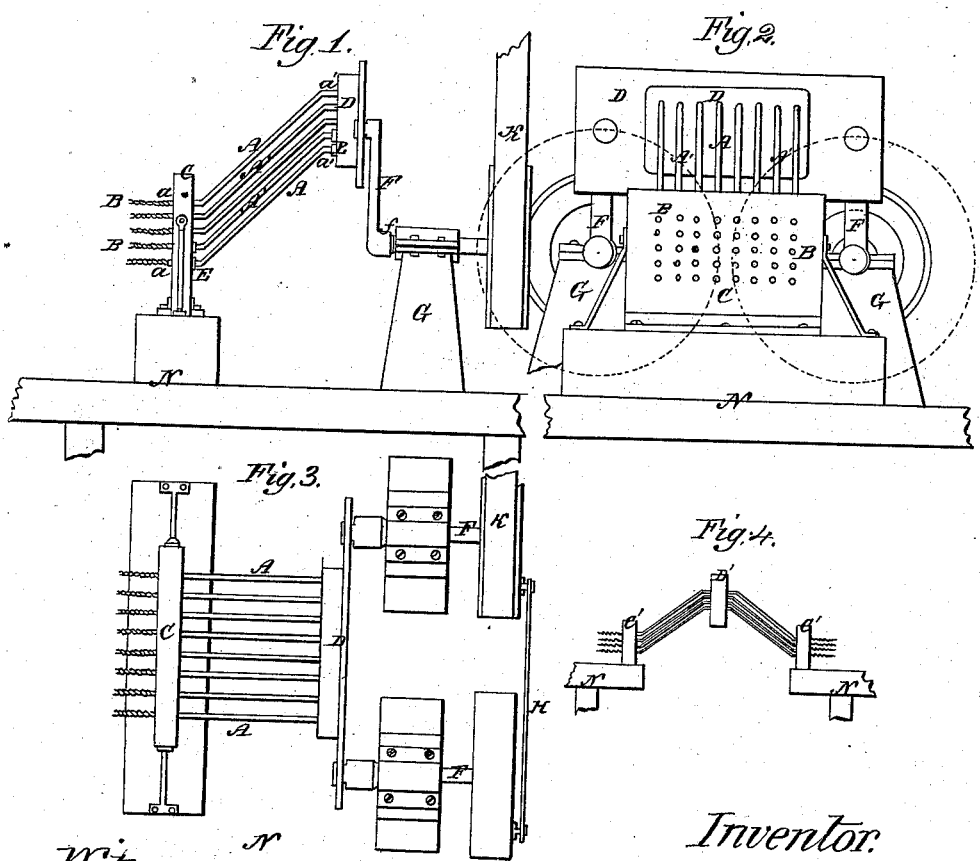
Witnesses.
J. B. Sunchin
G. A. Marner.
Inventor.
Charles F. Ritchel.

United States Patent Office.

CHARLES F. RITCHEL, OF CHICAGO, ILLINOIS.

Letters Patent No. 80,769, dated August 4, 1868.

IMPROVEMENT IN SERIAL CRANKS.

*The Schedule referred to in these Letters Patent and making part of the same.*

TO ALL WHOM IT MAY CONCERN:

Be it known that I, CHARLES F. RITCHEL, of the city of Chicago, in the county of Cook, and State of Illinois, have invented new and useful "Serial Crank;" and I do hereby declare that the following is a full and exact description thereof, reference being had to the accompanying drawing, making part of this specification, in which Figure 1 is the elevation, and Figure 2 is the plan of the machine, and Figure 3 is a side elevation of the double crank, and to the letters of reference marked thereon, like parts having like letters.

To enable others skilled in the art to which my invention appertains to make and use said invention, I will proceed to describe its construction and operation.

As the ordinary right-angled crank is not adapted for combined devices, in which a number of cranks very closely set can be simultaneously operated, as, for instance, in boring plates for small brushes, and the like, I adopted the obtuse-angled or inclined crank, to attain the above-said and other similar objects; and the nature of my invention consists in combining a series of such obtuse-angled or inclined cranks in a given space, in such a manner as to operate all of them simultaneously.

As I am not aware that the obtuse-angled crank or inclined crank was ever used for any certain and special mechanical purposes, I deem it necessary, in order to make my description clear and intelligible, to call its parts by different names.

My obtuse-angled or inclined crank A consists of the inclined shaft A' and arms or pins $a$ $a'$, which are parallel to each other, and form with shaft A' an angle of one hundred and thirty-five degrees, more or less.

My device consists of a combination of a series of obtuse-angled or inclined cranks, A A, in any desirable number, and in any proximity to each other, according to the space on which rotating points of suitable tools have to be concentrated. The boring, drilling, or other suitable tools to the proposed operation are attached to the ends of arms or pins $a$ $a$ in any convenient manner, or made of a piece with said arms, and the arms $a$ $a$ are passed through and retained in position by a stationary plate, C, or frame, or any other suitable fixture, arranged in the most convenient manner for the purpose, and mounted on a suitable frame, N. The other arms or pins, $a'$ $a'$, of the cranks are passed through or partially entered into a movable plate, D, frame, or any other suitable fixture, also arranged in a most suitable manner for the purpose required, and the face or working plane of the said plate, frame, or fixture, placed at a right angle to the said arms $a'$ $a'$. This movable plate rotates in its plane by means of ordinary crank-pins F F, having their working radius equal to the working radius of each of the inclined cranks A A.

Cranks F F are journalled to supports or standards G G, are provided, if necessary, with shoulders $ff$, for the purpose of moving plate D all the time in precisely the same plane, may be coupled by rods H H, and operated by a belt, K, passing over a pulley set on the shaft of one of them, and connected with an engine.

The operation of the device consists in this, that when power is communicated to cranks F F, plate D commences to rotate in its plane, moving arms $a'$ $a'$ simultaneously, and rotating the points of tools attached to the ends of arms $a$ $a$, the plate or other object to be operated upon being brought or approached to or pressed against the said points by hand, or automatically, as the case may be.

The obtuse-angled or inclined cranks, above described, instead of being single, can be made double, as represented on fig. 3, and, when combined in series, are kept in proper position by two stationary plates, C' C', frames, or other suitable fixtures, and are operated by one movable plate, D', or frame, or fixture, to which power is applied. In this case, a double series of rotating points, bearing tools, is obtained.

If desirable, a reciprocating rotary motion can be communicated to cranks F F, instead of a continuous rotary motion; in which case, the tools attached to cranks A A will rotate in a reciprocating manner.

Having thus described my device, I do not claim the combination of ordinary right-angled cranks for their simultaneous operation, neither do I claim the obtuse-angled or inclined crank *per se;* but

What I do claim, and desire to secure by Letters Patent, as new and as my invention, is—

1. The combination of a series of obtuse-angled or inclined cranks, A A, constructed and arranged as described, and operating simultaneously, for the purpose of performing boring, drilling, or some other useful mechanical operation, substantially as herein set forth and specified.

2. In combination with the above, the stationary plate C and the movable plate D, frames or fixtures, to retain in position and to operate cranks A A, substantially as and in the manner herein described and specified.

CHARLES F. RITCHEL.

Witnesses:
    J. B. TURCHIN,
    N. K. KROEBER.